Fowler & Bacon.
Broadcast Seeder.

N° 21,252.    Patented Aug. 24, 1858.

UNITED STATES PATENT OFFICE.

JOSEPH FOWLER AND F. M. BACON, OF RIPON, WISCONSIN.

IMPROVEMENT IN SEEDING-MACHINES.

Specification forming part of Letters Patent No. 21,252, dated August 24, 1858.

*To all whom it may concern:*

Be it known that we, JOSEPH FOWLER and F. M. BACON, of Ripon, in the county of Fond du Lac and State of Wisconsin, have invented a new and Improved Broadcast-Seeding Machine; and we do hereby declare that the following is a full, clear, and exact description of the same, reference being had to the annexed drawings, making a part of this specification, in which—

Figure 1:
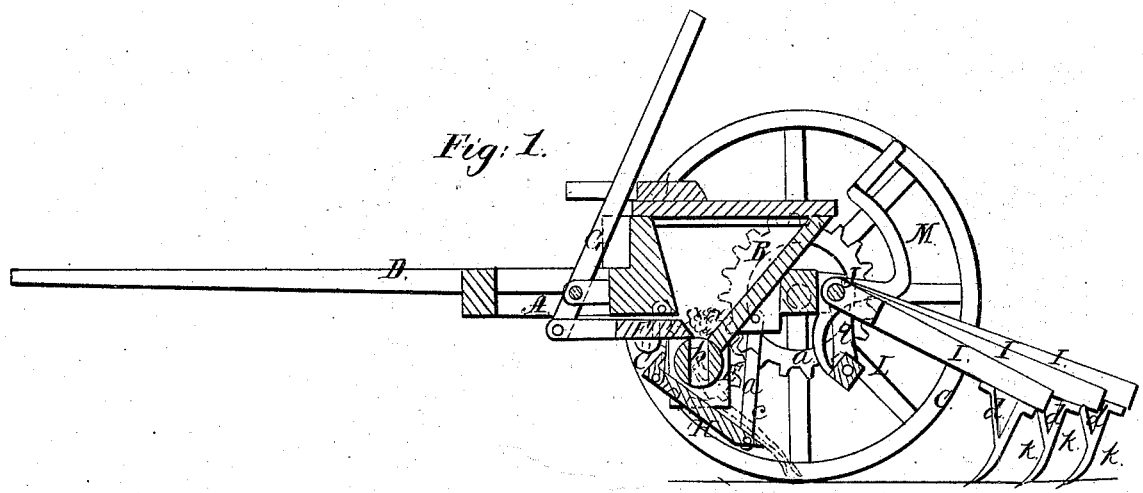
Figure 2:
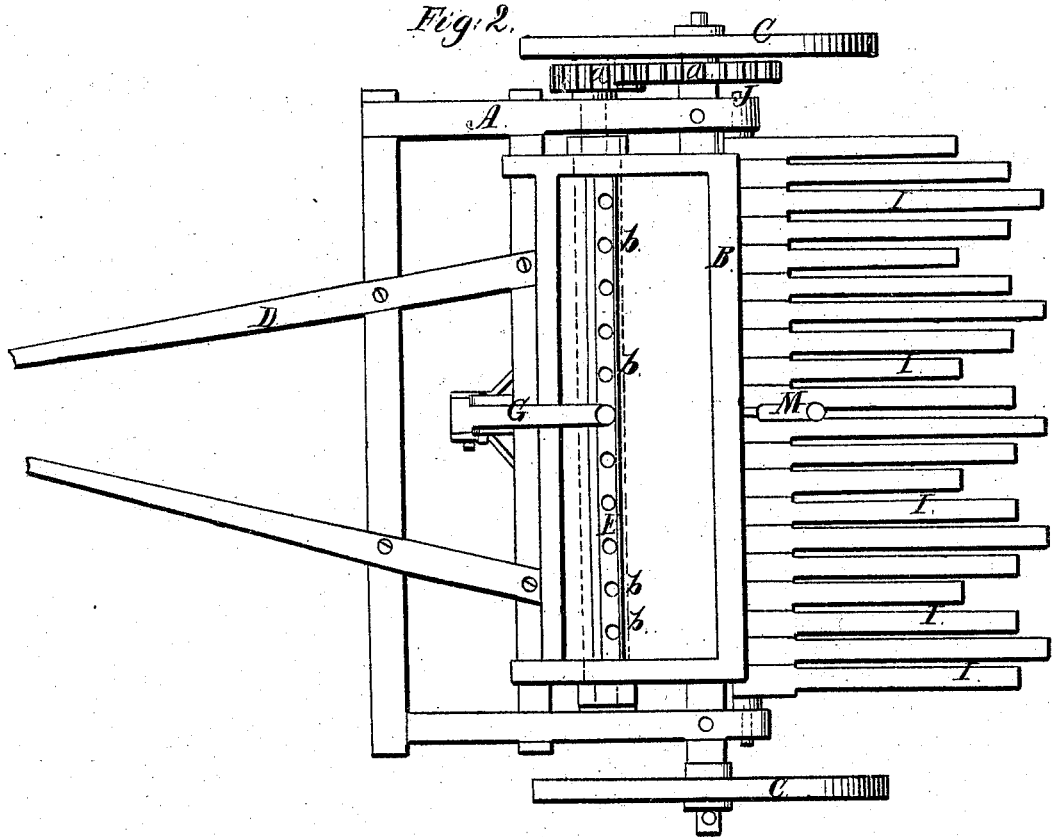

Figure 1 is a vertical central section of our invention, the plane of section bisecting the axle of the wheels on which the machine is mounted at right angles. Fig. 2 is a plan or top view of the same.

Similar letters of reference indicate corresponding parts in the two figures.

This invention consists in a seed-distributing device for scattering or sowing the seed in connection with a drag or harrow attachment, arranged as hereinafter shown and described, whereby the seed will be evenly sown and properly covered with earth and all the parts placed under the perfect control of the operator or attendant.

To enable those skilled in the art to fully understand and construct our invention, we will proceed to describe it.

A represents a rectangular frame, on which a seed-box, B, is placed. The frame A is mounted on wheels C C, and shafts or thills D are attached to its front end. The seed-box B transversely is of triangular or V form, and at its lower end a cylinder, E, is placed, said cylinder extending the whole length of the seed-box and forming its bottom. The cylinder E has a rotary motion given it from one of the wheels C by means of gearing a and a horizontal slide, F, works in the lower part of the seed-box and directly over the cylinder E, said slide having a lever, G, connected with it, by which the slide may be adjusted by the attendant or driver, whose seat may be on the seed-box B. The cylinder E has holes b made entirely through it transversely with its axis, the cylinder being quite closely perforated. Directly below the cylinder E an inclined board, H, is suspended by rods or bars c. The back end or edge of this board is the lower end, as shown clearly in Fig. 1.

I represents a series of bars, the front ends of which are hung loosely on a rod, J, attached to the back end of the frame A. These bars are made of varying lengths, so as to form in the aggregate a scalloped back end, as shown clearly in Fig. 2. To the back end of each bar I a curved metal tooth, K, is attached, said teeth having braces d formed with them.

L is a bar which is hung or suspended below the bars I by bars e e, and M is a lever which is placed on the rod J, the lower end of said lever being attached to the bar L.

As the machine is drawn along the cylinder E is rotated, and is, in fact, a rotary screen, the seed passing from box B through the holes or perforations b, and being thereby scattered on the board H, and from thence falling on the ground in an even broadcast manner. The teeth K pulverize the ground and cover the seed, each tooth being allowed to rise so as to pass over any obstructions, and in cases when all the teeth require to be raised in order to clear obstructions the operator grasps the lever M, and, drawing it toward him, thereby elevates the bars I, the bar L elevating the bars. In consequence of having the holes b pass entirely through the cylinder E, the seed is more evenly distributed than by the well-known seed cups or cells made in the cylinder, and by having the drag arranged as shown the seed is immediately covered, and its germinating principle will not be affected by exposure, as is now the case.

The device as a whole is extremely simple and efficient.

Having thus described our invention, what we claim as new, and desire to secure by Letters Patent, is—

The combination of the rotary perforated cylinder E, board H, and toothed bars I, arranged for joint action as described.

JOSEPH FOWLER.
F. M. BACON.

Witnesses:
O. J. CLARK,
S. B. McCUNE.